United States Patent
Lim et al.

(10) Patent No.: US 10,924,794 B2
(45) Date of Patent: Feb. 16, 2021

(54) REMOTE CONTROLLER, DISPLAY APPARATUS, SYSTEM AND METHOD FOR CONTROLLING THEREOF

(71) Applicant: SAMSUNG ELECTRONICS CO., LTD., Suwon-si (KR)

(72) Inventors: Chae-young Lim, Bucheon-si (KR); Kyung-ik Cho, Suwon-si (KR); Je-hwan Seo, Daegu (KR); Min-sup Kim, Suwon-si (KR); Ki-hyun Song, Suwon-si (KR); Suk-hoon Yoon, Yongin-si (KR); Hyun-kyu Yun, Seoul (KR); Jong-keun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/137,849

(22) Filed: Sep. 21, 2018

(65) Prior Publication Data
US 2019/0116334 A1  Apr. 18, 2019

(30) Foreign Application Priority Data
Oct. 13, 2017  (KR) ................. 10-2017-0133211

(51) Int. Cl.
*H04N 21/422* (2011.01)
*H04N 21/4227* (2011.01)
(Continued)

(52) U.S. Cl.
CPC ....... *H04N 21/42204* (2013.01); *G08C 17/02* (2013.01); *G08C 19/28* (2013.01);
(Continued)

(58) Field of Classification Search
None
See application file for complete search history.

(56) References Cited

U.S. PATENT DOCUMENTS 8,519,881 B2   8/2013  Park et al.
8,929,739 B2   1/2015  Hsieh et al.
(Continued)

FOREIGN PATENT DOCUMENTS

CN   102411840 A   4/2012
CN   102542782 A   7/2012
(Continued)

OTHER PUBLICATIONS

International Search Report dated Feb. 1, 2019 by the International Searching Authority in corresponding International Patent Application No. PCT/KR2018/011859 (PCT/ISA/210).
(Continued)

*Primary Examiner* — Curtis A Kuntz
*Assistant Examiner* — Jerold B Murphy
(74) *Attorney, Agent, or Firm* — Sughrue Mion, PLLC

(57) ABSTRACT

A remote controller is provided. The remote controller includes an input interface; a communicator; a storage; and a processor configured to: transmit, to the display apparatus via the communicator, a signal indicating control instructions based on a user input received through the input interface, receive, from the display apparatus via the communicator, information related to a first control code for controlling a first source device of the at least one source device based on the control instructions, identify the first control code from a first control code set stored in the storage based on the information related to the first control code, and control the communicator to transmit a first control signal indicating the first control code to the first source device.

13 Claims, 10 Drawing Sheets

(51) Int. Cl.
*G08C 23/04* (2006.01)
*G08C 17/02* (2006.01)
*G08C 19/28* (2006.01)
*H04N 21/41* (2011.01)

(52) U.S. Cl.
CPC ......... *G08C 23/04* (2013.01); *H04N 21/4108* (2013.01); *H04N 21/4131* (2013.01); *H04N 21/4227* (2013.01); *H04N 21/42203* (2013.01); *H04N 21/42226* (2013.01); *G08C 2201/30* (2013.01); *G08C 2201/50* (2013.01); *G08C 2201/70* (2013.01); *G08C 2201/92* (2013.01)

(56) References Cited

U.S. PATENT DOCUMENTS

| 10,003,763 | B2 | 6/2018 | Kim et al. | |
|---|---|---|---|---|
| 2004/0169590 | A1 | 9/2004 | Haughawout et al. | |
| 2005/0054289 | A1* | 3/2005 | Salazar | H04W 92/02 455/39 |
| 2006/0007015 | A1 | 1/2006 | Krzyzanowski et al. | |
| 2009/0121842 | A1 | 5/2009 | Elberbaum | |
| 2012/0075538 | A1 | 3/2012 | Okuda | |
| 2013/0156435 | A1 | 6/2013 | Hsieh et al. | |
| 2014/0313419 | A1* | 10/2014 | Kim | H04N 21/25891 348/734 |
| 2015/0179061 | A1* | 6/2015 | Kim | G08C 23/04 348/734 |
| 2017/0064215 | A1 | 3/2017 | Cho et al. | |
| 2017/0256160 | A1* | 9/2017 | Zhang | G08C 17/02 |
| 2018/0270525 | A1* | 9/2018 | Yu | H04N 5/4403 |

FOREIGN PATENT DOCUMENTS

| CN | 103702158 | A | | 4/2014 | |
|---|---|---|---|---|---|
| CN | 104967888 | A | | 10/2015 | |
| CN | 106375808 | A | | 2/2017 | |
| EP | 2 472 894 | A1 | | 7/2012 | |
| JP | 4413100 | B2 | | 2/2010 | |
| JP | 5626989 | B2 | | 11/2014 | |
| KR | 10-2013-0062477 | A | | 6/2013 | |
| KR | 20130062477 | | * | 6/2013 | ............ H04L 12/12 |
| KR | 10-2014-0029810 | A | | 3/2014 | |
| KR | 10-2014-0126231 | A | | 10/2014 | |
| KR | 10-1472912 | B1 | | 12/2014 | |
| KR | 10-2015-0075827 | A | | 7/2015 | |
| KR | 10-2017-0024480 | A | | 3/2017 | |

OTHER PUBLICATIONS

Written Opinion dated Feb. 1, 2019 by the International Searching Authority in corresponding International Patent Application No. PCT/KR2018/011859. (PCT/ISA/237).
Search Report dated Feb. 4, 2019 by the European Patent Office in counterpart European Patent Application No. 18196170.7.
Communication dated Dec. 14, 2020 issued by the State Intellectual Property Office of P.R. China in counterpart Chinese Application No. 201811187032.1.

* cited by examiner

US 10,924,794 B2

REMOTE CONTROLLER, DISPLAY APPARATUS, SYSTEM AND METHOD FOR CONTROLLING THEREOF

CROSS-REFERENCE TO RELATED APPLICATION

This application is based on and claims priority under 35 U.S.C. § 119 to Korean Patent Application No. 10-2017-0133211, filed on Oct. 13, 2017, in the Korean Intellectual Property Office, the disclosure of which is incorporated by reference herein in its entirety.

BACKGROUND

Field

The disclosure relates to a remote controller, a display apparatus, a system and a control method thereof, and more particularly, to a remote controller for controlling a source device, a display apparatus, a system and a control method thereof.

Description of Related Art

A method of using an infrared (IR) remote controller typically has been performed to control electronic devices in the home.

In a related art IR remote controller, electronic devices are controlled using an IR signal which may be transmitted and received only within a limited space. In this regard, obstacles (for example, storage space, furniture, and wall) obstruct an IR signal and reduce reliability in transmission and reception of signals between an electronic device and the IR remote controller.

In another related art, a radio frequency (RF) signal, such as a Bluetooth method, is used to control an electronic device. However, a complicated pairing setting process is required for the electronic device and the remote controller to be connected, and an electronic device incapable of transmitting and receiving RF signals may not be controlled by a RF signal.

That is, the IR remote controller has spatial limitations, and the RF remote controller may not control electronic devices that do not support RF communication and a user is required to pair the devices.

Accordingly, a method is needed for providing communication between devices without space limitations, without a troublesome pairing operation, and compatibility with a plurality of electronic devices.

SUMMARY

Provided are a remote controller that controls a source device using RF communication or IR communication and, when the source device providing content to a display apparatus is changed, automatically controls the changed source device, a display apparatus, a system and a control method thereof.

In accordance with an aspect of the disclosure, there is provided a remote controller configured to pair with at least one source device that is connected to a display apparatus. The remote controller includes: an input interface; a communicator; a storage; and a processor configured to: transmit, to the display apparatus via the communicator, a signal indicating control instructions based on a user input received through the input interface, receive, from the display apparatus via the communicator, information related to a first control code for controlling a first source device of the at least one source device based on the control instructions, identify the first control code from a first control code set stored in the storage based on the information related to the first control code, and control the communicator to transmit a first control signal indicating the first control code to the first source device.

The processor may be further configured to: receive, from the display apparatus via the communicator, identification information of a second source device connected to the display apparatus, pairing connection information corresponding to the second source device and a second control code set corresponding to the second source device; store the identification information of the second source device, the pairing connection information corresponding to the second source device and the second control code set in the storage; and perform pairing, via the communicator, with the second source device based on the identification information of the second source device and the pairing connection information corresponding to the second source device.

The information related to the first control code may include identification information of the first source device and first index information of the first control code corresponding to the control instructions in the first control code set, and the processor may be further configured to identify the first control code set corresponding to the first source device based on the identification information of the first source device and obtain the first control code from the first control code set identified based on the first index information.

The first control code set may include a first radio frequency control code set for controlling the first source device by radio frequency communication and a first infrared control code set for controlling the first source device by infrared communication, the communicator may include an infrared communicator and a radio frequency communicator, and the processor may be further configured to obtain a radio frequency control code from the first radio frequency control code set based on the information related to the first control code and transmit the first control signal based on the radio frequency control code to the first source device via the radio frequency communicator.

The processor may be further configured to check a pairing maintenance state with the at least one source device at a time interval, and based on pairing with the first source device of the at least one source device being released, request, via the communicator, the display apparatus to send information related to the first infrared control code set for controlling the first source device by infrared communication.

The processor may be further configured to identify a first infrared control code in the first control code set based on the information related to the first infrared control code set and transmit the first control signal indicating the first infrared control code to the first source device via the infrared communicator.

The processor may be further configured to check a pairing maintenance state with the at least one source device at a time interval, request, based on pairing with the first source device of the at least one source device being released, via the communicator, the display apparatus to send pairing connection information corresponding to the first source device, and perform pairing with the first source device based on the pairing connection information corresponding to the first source device received according to a request.

In accordance with an aspect of the disclosure, there is provided a display apparatus including: a display; a first communicator; a second communicator; a storage; and a processor configured to: identify, based on a signal including control instructions received from a remote controller through the second communicator, a first source device providing content output from at least one source device connected through the first communicator, identify information related to a first control code corresponding to the control instructions based on a first control code set of the first source device stored in the storage, and transmit the information related to the first control code to the remote controller through the second communicator.

The processor may be further configured to transmit, based on a second source device being connected through the first communicator, identification information of the second source device, pairing connection information corresponding to the second source device, and a second control code set corresponding to the second source device to the remote controller through the second communicator.

The first control code set stored in the storage may include a first radio frequency control code set for controlling the first source device by radio frequency communication and a first infrared control code set for controlling the first source device by infrared communication, and the processor may be further configured to obtain information related to a radio frequency control code corresponding to the control instructions based on the first radio frequency control code set stored in the storage and transmit the information related to the radio frequency control code to the remote controller through the second communicator.

The processor may be further configured to receive information concerning a pairing maintenance state between the remote controller and the at least one source device at a time interval through the second communicator, and based on the pairing maintenance state indicating that pairing between the remote controller and the at least one source device is released, obtain information related to an infrared control code corresponding to the control instructions from the first infrared control code set, and transmit the information related to the infrared control code to the remote controller through the second communicator.

In accordance with an aspect of the disclosure, there is provided a system including: a display apparatus; and a remote controller configured to pair with at least one source device that is connected to the display apparatus. The display apparatus is configured to: identify, based on a signal including control instructions being received from the remote controller, a first source device providing content output from the at least one source device, identify information related to a first control code corresponding to the control instructions based on a first control code set of the first source device, and transmit the information related to the first control code to the remote controller. The remote controller is further configured to: identify, based on the information related to the first control code being received from the display apparatus, the first control code from the first control code set based on the information related to the first control code, and transmit a first control signal indicating the first control code to the first source device.

In accordance with an aspect of the disclosure, there is provided a control method of a remote controller configured to pair with at least one source device that is connected to a display apparatus. The control method includes: transmitting a signal indicating control instructions to the display apparatus; receiving information related to a first control code for controlling a first source device of the at least one source device based on the control instructions from the display apparatus; identifying the first control code from a first control code set stored in the remote controller based on the information related to the first control code; and transmitting a first control signal indicating the first control code to the first source device.

The control method may further include: receiving identification information of a second source device connected to the display apparatus, pairing connection information corresponding to the second source device, and a second control code set corresponding to the second source device from the display apparatus; storing the identification information of the second source device, the pairing connection information corresponding to the second source device and the second control code set; and performing pairing with the second source device based on the identification information of the second source device and the pairing connection information corresponding to the second source device.

The information related to the first control code may include identification information of the first source device and first index information of the first control code corresponding to the control instructions in the first control code set, and the identifying may include identifying the first control code set corresponding to the first source device based on the identification information of the first source device and obtaining the first control code from the first control code set identified based on the first index information.

The first control code set may include a first radio frequency control code set for controlling the first source device by radio frequency communication and a first infrared control code set for controlling the first source device by infrared communication, the identifying of the first control code may include obtaining a radio frequency control code from the first radio frequency control code set based on the information related to the first control code, and the transmitting may include transmitting the first control signal based on the radio frequency control code to the first source device via by radio frequency communication.

The control method may further include: checking a pairing maintenance state with the at least one source device at a time interval, and requesting, based on pairing with the first source device of the at least one source device being released, the display apparatus to send information related to the first infrared control code set for controlling the first source device by infrared communication.

The identifying the first control code may include identifying a first infrared control code in the first control code set based on the information related to the first infrared control code set, and the transmitting may include transmitting the first control signal indicating the first infrared control code to the first source device via infrared communication.

The control method may further include: checking a pairing maintenance state with the at least one source device at a time interval, requesting, based on pairing with the first source device of the at least one source device being released, the display apparatus to send pairing connection information corresponding to the first source device, and pairing with the first source device based on the pairing connection information corresponding to the first source device received according to a request.

In accordance with an aspect of the disclosure, there is provided a remote controller configured to pair with a first device that is connected to a second device, the remote controller including: an input interface; a communicator; and a processor configured to: transmit, to the first device via the communicator, a first signal indicating control instructions based on an input received through the input interface, receive, from the second device via the communicator, a second signal indicating information related to the input received through the input interface, identify a command based on the second signal received from the second device, and transmit, to the second device via the communicator, a third signal indicating the command.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
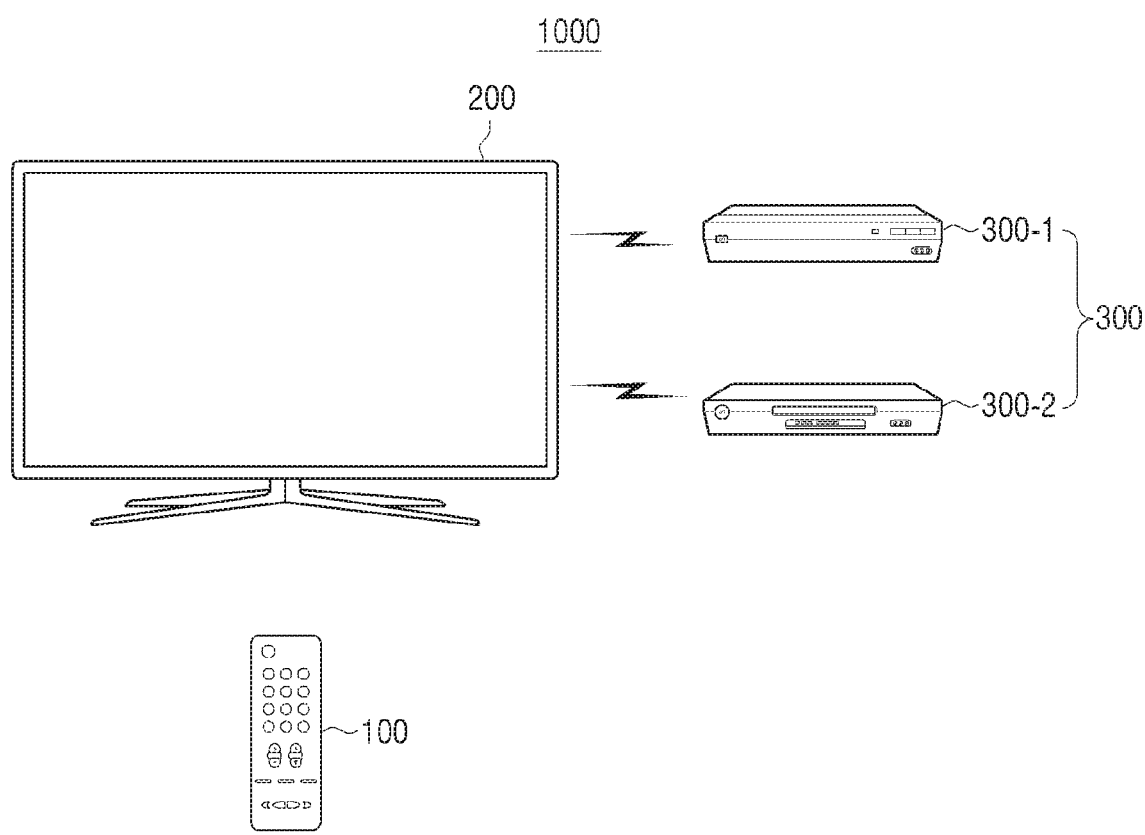
FIG. 1 is a diagram illustrating an electronic system according to an embodiment.

Hereinafter, embodiments will be described in more detail with reference to the accompanying drawings. In the following description, known functions or configurations may be omitted. In addition, the following embodiments may be modified into various other forms, and the scope of the present disclosure is not limited to the following embodiments. Rather, these embodiments are provided so that the present disclosure will be more thorough and complete, and will fully convey the scope of the present disclosure to those skilled in the art.

As used herein, the term, 'comprising' means that other configurations may be included, rather than excluding other configurations, unless specifically stated otherwise. As used herein, the terms "1st" or "first" and "2nd" or "second" may use corresponding components regardless of importance or order and are used to distinguish a component from another component without limiting the components. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. Further, various elements and regions in the drawings are schematically illustrated. Accordingly, the technical spirit is not limited by the relative size or spacing illustrated in the accompanying drawings.

FIG. 1 is a diagram illustrating an electronic system 1000 according to an embodiment.

As shown in FIG. 1, the electronic system 1000 includes a remote controller 100 and a display apparatus 200. Here, the display apparatus 200 may be connected to a source device 300 and may receive and display content from the source device 300.

The remote controller 100 may perform communication with the display apparatus 200 and the source device 300. In particular, the remote controller 100 may control the source device 300. For example, the remote controller 100 may be an integrated remote controller for controlling the display apparatus 200 and the source device 300. However, the present disclosure is not limited thereto, and the remote controller 100 may be various types of devices capable of controlling the source device 300.

The remote controller 100 according to an embodiment may be paired with the source device 300. For example, the remote controller 100 may be paired with each of a first source device 300-1 and a second source device 300-2 according to the Bluetooth standard to store connection information such as a media access control address (MAC address). That is, the remote controller 100 may be paired with multiple devices, including the plurality of source devices 300-1 and 300-2.

The remote controller 100 may be implemented to receive pairing connection information and a control code set corresponding to the source device 300 from the display apparatus 200 and store the received pairing connection information and the control code set in the remote controller 100. That is, the remote controller 100 may receive the pairing connection information and the control code set corresponding to the source device 300 connected to the display apparatus 200 from the display apparatus 200 and perform pairing with the source device 300 based on the receive pairing connection information and control code set. Also, the source device 300 may be controlled based on the received control code set. A detailed description thereof will be described later.

The display apparatus 200 may receive and display the content from the source device 300. Here, the source device 300 may be a content providing device such as a set-top box, a digital versatile disc (DVD) player, a Blu-ray player, and a sound device. However, the present disclosure is not limited thereto, and the source device 300 may be various types of devices connected to the display apparatus 200 in a wired or wireless manner to provide content to the display apparatus 200.

According to an embodiment, the display apparatus 200 may manually or automatically identify the source device 300 connected to the display apparatus 200 to obtain identification information. For example, when manually identifying the source device 300, the display apparatus 200 may display a list user interface (UI) of the source device 300 for each manufacturer and model, and identify the source device 300 according to a user input as the source device 300 connected to the display apparatus 200. As another example, when automatically identifying the source device 300, the display apparatus 200 may analyze the content provided from the source device 300 to identify the source device 300 and receive the identification information from the source device 300. A detailed description thereof will be given later.

The display apparatus 200 according to an embodiment may store the pairing connection information and the control code set corresponding to the source device 300. For example, the display apparatus 200 may store the pairing connection information and the control code set of the source device 300 for various manufacturers and models. Here, the pairing connection information is information required when performing pairing with the source device 300 in the RF communication method.

Information required for performing pairing may be different for each source device 300. For example, the first source device 300-1 may require a pin code to be input when performing pairing with an external device, and the second source device 300-2 may require a predetermined button be pressed without having to input the pin code.

Accordingly, the pairing connection information may include at least one of a pin code, a device identifier (ID), a universally unique identifier (UUID) and a MAC address corresponding to the source device 300 and information about the operation required to perform pairing with the source device 300. According to an embodiment, the pairing connection information and the control code set of the source device 300 may be received from an external server.

The display apparatus 200 may identify the source device 300 connected to the display apparatus 200 to obtain the identification information and transmit the pairing connection information and the control code set corresponding to the source device 300 to the remote controller 100. The remote controller 100 may perform pairing with the source device 300 based on the identification information of the source device 300 received from the display apparatus 200 and the pairing connection information. Further, the remote controller 100 may store the received control code set.

The operations of the remote controller 100 and the display apparatus 200 included in the electronic system 1000 are briefly described above. Hereinafter, a method performed by the remote controller 100 of controlling the source device 300 connected to the display apparatus 200 will be described in detail.

Figure 2:
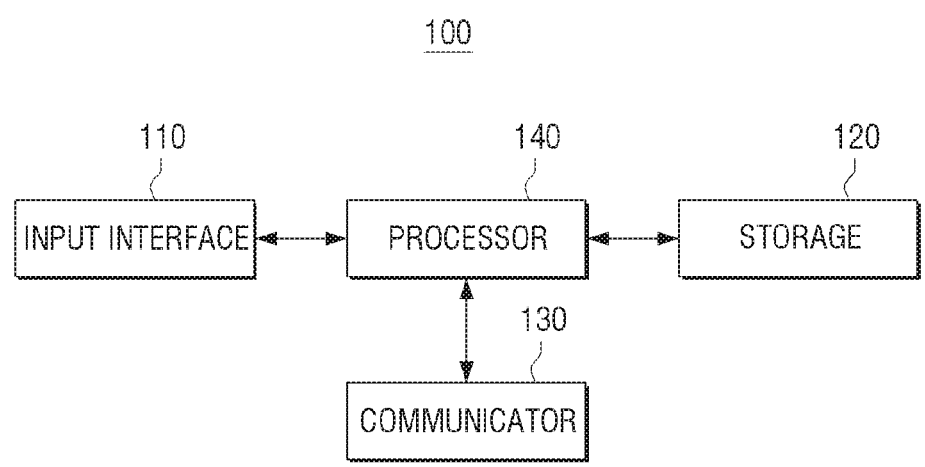
FIG. 2 is a block diagram showing a configuration of a remote controller according to an embodiment.

FIG. 2 is a block diagram showing a configuration of the remote controller 100 according to an embodiment.

Referring to FIG. 2, the remote controller 100 includes an input interface 110, a storage 120, a communicator 130, and a processor 140.

The input interface 110 receives various control instructions of a user. Here, the input interface 110 may be implemented in various forms according to an embodiment of the remote controller 100. For example, the input interface 110 may be a button provided on the remote controller 100, a microphone for receiving a user's voice, a camera for detecting a motion of the user, and the like. Alternatively, when the remote controller 100 is implemented as a touch-based electronic device, the input interface 110 may be implemented as touch pad or a touch screen having a mutual layer structure with a touch pad. In particular, control instructions of the user input through the input interface 110 may be transmitted to the processor 140.

The storage 120 stores various data such as information about an operating system (O/S) software module for driving the remote controller 100, various communication modules, the paired plurality of source devices 300-1 and 300-2, etc.

The storage 120 may be implemented as internal memory such as read-only memory (ROM) or random-access memory (RAM) included in the processor 140 or may be implemented as separate memory from the processor 140. In this case, the storage 120 may be implemented as memory embedded in the remote controller 100 or may be implemented as memory removably attached to the remote controller 100 according to the purpose of data storage. For example, data for driving the remote controller 100 may be stored in the memory embedded in the remote controller 100, and data for an extension function of the remote controller 100 may be stored in the memory removably attached to the remote controller 100. Meanwhile, the memory embedded in the remote controller 100 may be implemented in the form of nonvolatile memory, volatile memory, hard disk drive (HDD), solid state drive (SSD), or the like, and the memory removably attached to the remote controller 100 may be implemented in the form of a memory card (for example, a micro Secure Digital (SD) card, Universal Serial Bus (USB) memory or the like), external memory (for example, a USB memory) connectable to a USB port, or the like.

In particular, the storage 120 may store identification information of the source device 300 received from the display apparatus 200 and pairing connection information and a control code set corresponding to the source device 300. As shown in FIG. 1, the display apparatus 200 may be connected to the plurality of source devices 300-1 and 300-2, and accordingly, the storage 120 may include identification information of each of the source devices 300-1 and 300-2, the pairing connection information and the control code set corresponding to each of the plurality of source devices 300-1 and 300-2.

For example, the storage 120 may store the identification information of the first source device 300-1, the pairing connection information including information required to perform pairing with the first source device 300-1 and the control code set corresponding to the first source device 300-1.

The control code set corresponding to the source device 300 according to an embodiment may include an RF control code set and an IR control code set. Here, the RF control code set refers to a control code set used when the remote controller 100 transmits a control code for controlling the source device 300 through RF communication, and the IR control code set refers to a control code set used when the remote controller 100 transmits the control code for controlling the source device 300 through IR communication. A detailed description thereof will be given later.

The communicator 130 may be a transceiver (transmitter and receiver) or communication interface that communicates with the display apparatus 200 and the plurality of source devices 300-1 and 300-2.

The communicator 130 may communicate with the display apparatus 200 and the plurality of source devices 300-1 and 300-2 through various communication methods using RF and IR such as Local Area Network (LAN), cable, wireless LAN, cellular, Device to Device (D2D), Bluetooth, Bluetooth low energy (BLE), 3G, Long-Term Evolution (LTE), wireless LAN network (Wi-Fi), ad-hoc type Wi-Fi direct and LTE direct, Zigbee, Near Field Communication (NFC), and the like. To this end, the communicator 130 may include an RF communication module and an IR communication module such as a Zigbee communication module, a Bluetooth communication module, a BLE communication module, and a Wi-Fi communication module.

The processor 140 according to an embodiment controls the overall operation of the remote controller 100. The processor 140 may include one or more of a digital signal processor (DSP), a central processing unit (CPU), a controller, an application processor (AP), a communication processor (CP), and an ARM processor or may be defined as the corresponding term. The processor 140 may also be implemented as a system on chip (SoC) and large scale integration (LSI) with a built-in processing algorithm, or may also be implemented as a field programmable gate array (FPGA).

The processor 140 may include the CPU, the ROM (or nonvolatile memory) storing a control program for controlling the remote controller 100 and the RAM (or volatile memory) storing data input from the outside of the remote controller 100 or used as a storage area corresponding to various operations performed in the remote controller 100.

The CPU accesses the storage 120 and performs booting using the O/S stored in the storage 120. Then, the CPU performs various operations using various programs, contents, data, and the like stored in the storage 120.

In particular, the processor 140 may receive from the display apparatus 200 the identification information of the source device 300, the information required to perform pairing with the source device 300, and the control code set corresponding to the source device 300 and store the same in the storage 120. Here, the information required to perform pairing may include at least one of the pin number, the device ID, the universally unique identifier (UUID) and the MAC address of the source device 300, and the information about the operation required to perform pairing with the source device 300. Hereinafter, for convenience of explanation, the information required to perform pairing will be collectively referred to as pairing connection information.

The source device 300 may be an external device connected to the display apparatus 200 and providing content to the display apparatus 200. For example, when a set-top box is connected to the display apparatus 200 as a source device 300, the display apparatus 200 may transmit identification information of the set-top box according to at least one of a manufacturer, a model, and a broadcasting company of the set-top box, pairing connection information corresponding to the set-top box and a control code set to the remote controller 100. A detailed description thereof will be given in FIG. 3 relating to the detailed configuration of the display apparatus 200.

The processor 140 according to an embodiment may control the communicator 130 to perform pairing with the source device 300 based on the received identification information of the source device 300 and pairing connection information. Pairing between the remote controller 100 and the source device 300 may be performed using a radio frequency (RF) signal and may use a communication standard such as Bluetooth or Zigbee. Hereinafter, it will be described for convenience of explanation that the Bluetooth communication standard is used. However, the present disclosure is not limited thereto, and any communication standard capable of performing pairing between devices using the RF signal may be used.

When control instructions of the user are input through the input interface 110, the processor 140 may control the communicator 130 to transmit a signal including the control instructions to the display apparatus 200. For example, when a pressing operation is input with respect to a volume up button among a plurality of physical buttons provided in the remote controller 100, the processor 140 may transmit a signal corresponding to volume up through the communicator 130 to the display apparatus 200.

However, the signal including the control instructions may not include a control code for controlling the display apparatus 200 or the first source device 300-1 connected to the display apparatus 200 to correspond to the control instructions. That is, even when the signal including the control instructions is transmitted to the display apparatus 200 or the first source device 300-1, the display apparatus 200 or the first source device 300-1 may not perform a function corresponding to the control instructions. For example, even when a signal including volume up control instructions is transmitted to the display apparatus 200, the volume of the display apparatus 200 or the first source device 300-1 does not increase.

The processor 140 according to an embodiment may transmit the signal including the control instructions of the user input through the input interface 110 to the display apparatus 200 through the communicator 130 and receive the information related to the control code for controlling the first source device 300-1 among the at least one source device 300-1 and 300-2 to correspond to the control instructions from the display apparatus 200. When the display apparatus 200 receives the signal including the control instructions of the user from the remote controller 100, the display apparatus 200 may obtain information related to the control code corresponding to the control instructions and transmit the obtained information related to the control code to the remote controller 100. A specific configuration and a method performed by the display apparatus 200 of obtaining the information related to the control code corresponding to the control instructions of the user will be described later.

When the information related to the control code for controlling the first source device 300-1 to correspond to the control instructions is received through the communicator 130, the processor 140 may obtain a control code among the control code set stored in the storage 120 based on the received information. For example, the information related to the control code received from the display apparatus 200 may include identification information of the first source device 300-1 and index information of the control code corresponding to the control instructions. Accordingly, the processor 140 may identify the control code set corresponding to the first source device 300-1 among the control code set stored in the storage 120 based on the identification information of the first source device 300-1 and obtain the control code corresponding to the control instructions in the control code set based on the index information. Here, the index information means indicator information for identifying a specific control code among the control code set. Accordingly, the index information may include at least one of a type of the control code, an ID, and a position in the control code set. The type of control code may refer to an RF or IR type. For example, when the type of the control code is the RF type, the processor 140 may identify the RF control code set among the RF control code set and the IR control code set corresponding to the first source device 300-1 and obtain the control code corresponding to the control instructions from the RF code set.

The processor 140 according to an embodiment may control the communicator 130 to be paired with each of the plurality of source devices 300-1 and 300-2 connected to the display apparatus 200. For example, it may be assumed that when the remote controller 100 is paired with the first source device 300-1 connected to the display apparatus 200, the second source device 300-2 is additionally connected to the display apparatus 200. When the second source device 300-2 is additionally connected, the display apparatus 200 may transmit the identification information of the second source device 300-2, the pairing connection information and the control code set corresponding to the second source device 300-2 to the remote controller 100. Here, the identification information may include information about whether the second source device 300-2 supports RF communication.

When it is identified that the second source device 300-2 supports RF communication based on the identification information of the second source device 300-2, the processor 140 may perform pairing with the second source device 300-2 based on the pairing connection information. Accordingly, the remote controller 100 may be paired with each of the first source device 300-1 and the second source device 300-2.

The processor 140 according to an embodiment may check a pairing maintenance state with the source device 300 at a predetermined time interval. For example, when the remote controller 100 is paired with each of the first and second source devices 300-1 and 300-2, the processor 140 may check the pairing maintenance state with each of the first and second source devices 300-1 and 300-2 at the predetermined time interval.

As described above, when the remote controller 100 and the first source device 300-1 are paired, the information related to the control code transmitted from the display apparatus 200 may include the index information of the RF control code corresponding to the control instructions in the RF code set of the first source device 300-1 and the processor 140 may obtain the RF control code corresponding to the control instructions based on the index information. Here, the first source device 300-1 may be the source device 300 connected to the display apparatus 200 and providing content that the display apparatus 200 is outputting.

When it is identified that the first source device 300-1 is unpaired, the processor 140 according to another embodiment may request the display apparatus 200 to send the information related to the control code for controlling the first source device 300-1 by IR communication.

Specifically, when the remote controller 100 and the first source device 300-1 are unpaired, the processor 140 may request the display apparatus 200 to send the information related to the control code for controlling the first source device 300-1 by IR communication, to obtain the IR control code corresponding to the control instructions. Accordingly, the information related to the control code transmitted from the display apparatus 200 may include the index information of the IR control code corresponding to the control instructions in the IR control code set of the first source device 300-1. The processor 140 may obtain the IR control code corresponding to the control instructions based on the index information.

The processor 140 according to another embodiment may transmit the pairing maintenance state to the display apparatus 200 at a predetermined time interval. However, the present disclosure is not limited thereto, and the processor 140 may transmit the pairing maintenance state based on a request of the display apparatus 200. For example, the display apparatus 200 may request the pairing maintenance state be transmitted by the remote controller 100 when a preset event occurs. For example, when the display apparatus 200 changes the source device 300 receiving content from the first source device 300-1 to the second source device 300-2, the display apparatus 200 may request the pairing maintenance state of the second source device 300-2 and the remote controller 100. The display apparatus 200 may include the index information of the RF control code or the index information of the IR control code in the information related to the control code based on the pairing maintenance state transmitted from the remote controller 100. A detailed description thereof will be described later.

The processor 140 may transmit a control signal including the obtained control code to the source device 300 through the communicator 130. The remote controller 100 according to an embodiment is paired with the first source device 300-1 and the processor 140 may transmit the obtained control code to the first source device 300-1 through RF communication. Specifically, the communicator 130 may include an RF communication module and an IR communication module, and when obtaining the RF control code, the processor 140 may transmit the control signal including the RF control code to the first source device 300-1 through the RF communication module.

For another example, when the remote controller 100 is unpaired from the first source device 300-1, the processor 140 may transmit the obtained control code to the first source device 300-1 using IR communication. Specifically, when the processor 140 obtains the IR control code, the processor 140 may transmit the control signal including the IR control code to the first source device 300-1 through the IR communication module.

Figure 3:
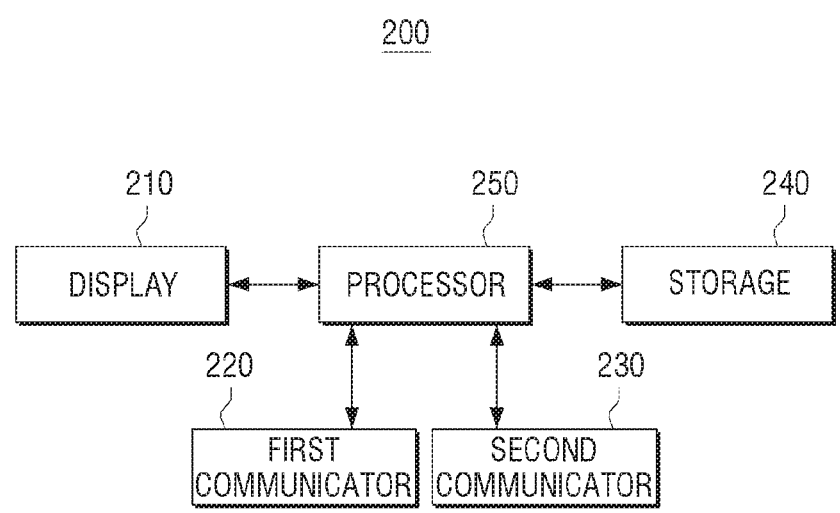
FIG. 3 is a block diagram showing a configuration of a display apparatus according to an embodiment.

FIG. 3 is a block diagram showing a configuration of the display apparatus 200 according to an embodiment.

Referring to FIG. 3, the display apparatus 200 includes a display 210, a first communicator 220, a second communicator 230, a storage 240, and a processor 250.

The display 210 may display content provided by the source device 300 connected to the display apparatus 200 through the first communicator 220.

Here, the content may include various content such as an image, a moving picture, text, music, an application, a graphic user interface (GUI) screen, and the like.

Meanwhile, the display 210 may be implemented as various types of displays such as a liquid crystal display (LCD) panel, an organic light-emitting diode (OLED) display panel, a liquid crystal on silicon (LCoS) display panel, digital light processing (DLP) display panel, etc. The display 210 may also be implemented as a transparent display that is implemented with a transparent material and displays information. For example, the transparent display may display the information by selectively adjusting transparency.

The display 210 according to an embodiment may be implemented as a touch screen having a mutual layer structure with a touch pad. In this case, the display 210 may be used as a user interface in addition to content output.

The first communicator 220 may be a transceiver (transmitter and receiver) or communication interface that communicates with the source device 300 to receive content. The first communicator 220 may be connected to the plurality of source devices 300-1 and 300-2 using at least one of wire/wireless methods and receive content from each of the plurality of source devices 300-1 and 300-2.

For example, the first communicator 220 may be implemented to support at least one communication method of various types of digital interfaces including, an access point-based (AP-based) Wi-Fi, LAN, Bluetooth, Zigbee, WAN, Ethernet, IEEE 1394, HDMI, USB, Mobile High-Definition Link (MHL), AES/EBU, optical, coaxial, and the like.

The second communicator 230 may be a transceiver (transmitter and receiver) or communication interface that communicates with the remote controller 100.

The second communicator 230 may perform communication with the remote controller 100 through various communication methods including LAN, cable, Wi-Fi, cellular, Device to Device (D2D), Bluetooth, Bluetooth low energy (BLE), 3G, LTE, ad-hoc type Wi-Fi direct, LTE direct, Zigbee, NFC, and the like. To this end, the second communicator 230 may include an RF communication module and an IR communication module such as a Zigbee communication module, a Bluetooth communication module, a BLE communication module, and a Wi-Fi communication module.

The storage 240 stores various data such as an O/S software module for driving the display apparatus 200, various communication modules, information about the plurality of source devices 300-1 and 300-2, etc.

The storage 240 may be implemented as internal memory such as ROM or RAM included in the processor 250 or may be implemented as separate memory from the processor 250. In this case, the storage 240 may be implemented as memory embedded in the display apparatus 200 or may be implemented as memory removably attached to the display apparatus 200 according to the purpose of data storage. For example, data for driving the display apparatus 200 may be stored in the memory embedded in the display apparatus 200, and data for an extension function of the display apparatus 200 may be stored in the memory removably attached to the display apparatus 200. Meanwhile, the memory embedded in the display apparatus 200 may be implemented in the form of nonvolatile memory, volatile memory, HDD, SSD, or the like, and the memory removably attached to the display apparatus 200 may be implemented in the form of a memory card (for example, a micro SD card, USB memory or the like), external memory (for example, a USB memory) connectable to a USB port, or the like.

In particular, the storage 240 may store a plurality of control codes. To transmit a control code set corresponding to the source device 300 connected to the display apparatus 200 to the remote controller 100, the storage 240 may store various control code sets for different manufacturers of the various source devices 300 or each model thereof. Also, the storage 240 may store identification information and pairing connection information of each of the plurality of source devices 300-1 and 300-2. For example, at a manufacturing state of the display apparatus 200, the identification information, the pairing connection information, and the control code set of each of the plurality of source devices 300-1 and 300-2 may be stored in the storage 240. However, the present disclosure is not limited thereto, and the display apparatus 200 may communicate with an external server to receive the identification information, the pairing connection information, and the control code set of the source device 300, which may then be stored in the storage 240. For example, identification information, pairing connection information, and a control code set of the newly released source device 300 after the manufacture of the display apparatus 200 may be received and stored from the external server. The identification information, the pairing connection information, and the control code set of each of the plurality of source devices 300-1 and 300-2 may be stored in the storage 240 in a manner such as a firmware update of the display apparatus 200.

The control code set corresponding to the source device 300 stored in the storage 240 according to an embodiment may include an RF control code set and an IR control code set. Because control codes may be different when the source device 300 is controlled by RF communication and when the source device 300 is controlled by IR communication, the RF control code set for controlling the source device 300 by RF communication and the IR control code set for controlling the source device 300 by IR communication may be stored.

The pairing connection information corresponding to the source device 300 stored in the storage 240 may refer to information required when performing pairing with the source device 300. For example, the pairing connection information may include at least one of a pin code, a device ID, a UUID and a MAC address corresponding to the source device 300, and information about an operation required to perform paring with the source device 300. It is described above that the remote controller 100 may perform pairing with the source device 300 based on the pairing connection information because the pairing connection information is transmitted to the remote controller 100.

The processor 250 according to an embodiment controls the overall operation of the display apparatus 200. The processor 250 may include one or more of a DSP, a CPU, a controller, an AP, a CP, and an ARM processor or may be defined as the corresponding term. The processor 250 may also be implemented as an SoC, an LSI with a built-in processing algorithm, or an FPGA.

The processor 250 may include the CPU, the ROM (or nonvolatile memory) storing a control program for controlling the display apparatus 200 and the RAM (or volatile memory) storing data input from the outside of the display apparatus 200 or used as a storage area corresponding to various operations performed in the display apparatus 200.

The CPU accesses the storage 240 and performs booting using the O/S stored in the storage 240. Then, the CPU performs various operations using various programs, contents, data, and the like stored in the storage 240.

In particular, the processor 250 may identify the source device 300 providing the content through the first communicator 220. That is, the processor 250 may identify the source device 300 providing the content being output by the display 210. For example, when the first source device 300-1 and the second source device 300-2 are connected to each other and the content provided by the first source device 300-1 is being output through the display 210, the processor 250 may identify the first source device 300-1 and obtain the identification information. The processor 250 may manually or automatically identify the first source device 300-1. Here, a manual method may provide a list of a plurality of source devices, and when a manufacturer, a model, and the like are selected according to user instructions, obtain the identification information of the first source device 300-1 based on the selected manufacturer and model. As another example, an automatic method may receive the identification information of the first source device 300-1 from the first source device 300-1 or analyze the content received through the first source device 300-1 and identify a manufacturer, a model, etc. of the first source device 300-1. However, the present disclosure is not limited to such the manual or automatic method, and the processor 250 may identify the manufacturer and the model of the first source device 300-1 using various methods to obtain the identification information.

The processor 250 according to another embodiment may receive a signal including control instructions of the user from the remote controller 100 through the second communicator 230 and identify the first source device 300-1 providing the content output through the display 210. That is, when the signal including the control instructions is received from the remote controller 100, the processor 250 may identify a source device providing the content that is currently output, and when the signal is not received, identify the source device providing the content that is currently output and obtain identification information.

The processor 250 may identify a control code set corresponding to the first source device 300-1 among a plurality of control code sets stored in the storage 240 based on the obtained identification information. Also, the processor 250 may identify a control code corresponding to the control instructions of the user from the control code set corresponding to the first source device 300-1 and obtain index information of the identified control code. For example, when the control instructions of the user are volume up, the processor 250 may identify a control code for increasing the volume of the first source device 300-1 from the control code set of the first source device 300-1 and obtain the index information. Here, the index information may mean an indicator for obtaining a specific control code in the control code set. For example, the index information may include information about an order and an ID of the control code corresponding to the volume up in the control code set.

The processor 250 according to an embodiment may transmit information related to the control code to the remote controller 100 through the second communicator 230. Here, the information related to the control code may include the identification information and the index information of the first source device 300-1. For example, when the control instructions are the volume up, the processor 250 may transmit the identification information of the first source device 300-1 and the index information for obtaining the control code corresponding to the volume up in the control code set of the first source device 300-1 to the remote controller 100.

The processor 250 according to an embodiment may transmit information related to the RF control code corresponding to the control instructions in the RF control code set of the first source device 300-1 to the remote controller 100. The remote controller 100 may identify the RF control code set corresponding to the first source device 300-1 in the storage 120 provided in the remote controller 100 and obtain the RF control code corresponding to the control instructions based on the index information in the RF control code set. Further, a control signal including the obtained RF control code may be transmitted to the paired first source device 300-1 using RF communication.

The processor 250 according to an embodiment may receive information about a pairing maintenance state between the remote controller 100 and the source device 300 through the second communicator 230 at a predetermined time interval and identify whether pairing between the remote controller 100 and the source device 300 is maintained based on the received information.

For example, when the display apparatus 200 is connected to the plurality of source devices 300-1 and 300-2, the remote controller 100 is paired with each of the first and second source devices 300-1 and 300-2, and may transmit the information about the pairing maintenance state to the display apparatus 200 at the predetermined time interval. However, the information about the pairing maintenance state is not limited to being transmitted at the predetermined time interval. As another example, when the remote controller 100 is not paired with the source device 300 other than the predetermined time interval, the remote controller 100 may transmit information indicating that pairing is released to the display apparatus 200. As another example, when the source device 300 providing the content to the display apparatus 200 is changed from the first source device 300-1 to the second source device 300-2, the display apparatus 200 may request the remote controller 100 to send the information about the pairing maintenance state between the remote controller 100 and the source device 300. When the remote controller 100 transmits the information about the pairing maintenance state to the display apparatus 200 according to such a request, the processor 250 may identify whether pairing between the remote controller 100 and the source device 300 is maintained. For example, the processor 250 may identify the pairing maintenance state between the remote controller 100 and the first source device 300-1 and the pairing maintenance state between the remote controller 100 and the second source device 300-2.

When it is identified that pairing between the remote controller 100 and the first source device 300-1 is released based on the information about the pairing maintenance state between the remote controller 100 and the first source device 300-1 received at the predetermined time interval, the processor 250 according to an embodiment may determine the remote controller 100 is in a state where the first source device 300-1 may not be controlled by RF communication and instead must transmit control information to the first source device 300-1 using IR communication. That is, because the remote controller 100 must transmit the control code to the first source device 300-1 using IR communication, not RF communication, the processor 250 may transmit the information about the IR control code corresponding to the control instructions to the remote controller 100.

The processor 250 may obtain the information related to the IR control code corresponding to the control instructions in the IR control code set corresponding to the first source device 300-1. For example, when the control instructions are the volume up, the processor 250 may identify an IR control code that increases the volume of the first source device 300-1 in the IR control code set and transmit index information of the identified IR control code to the remote controller 100 together with the identification information of the first source device 300-1 through the second communicator 230. Accordingly, the remote controller 100 may identify the IR control code set corresponding to the first source device 300-1 in the storage 120 provided in the remote controller 100 and obtain the IR control code corresponding to the control instructions in the IR control code set based on the index information. Also, the processor 250 may transmit a signal including the obtained IR control code to the first source device 300-1 using IR communication.

When the second source device 300-2 is additionally connected through the first communicator 220, the processor 250 according to an embodiment may identify the identification information of the second source device 300-2, the pairing connection information with the second source device 300-2, and the control code set corresponding to the second source device 300-2 to the remote controller 100 through the second communicator 230. Accordingly, the remote controller 100 may receive and store the identification information of the second source device 300-2, the pairing connection information with the second source device 300-2, and the control code set corresponding to the second source device 300-2, in addition to the identification information of the first source device 300-1, the pairing connection information with the first source device 300-1, and the control code set corresponding to the first source device 300-1.

It is described in the above-described various embodiments that the content being output by the display apparatus 200 is content provided from the first source device 300-1. When the display apparatus 200 is connected to a plurality of source devices and the source device providing content to the display apparatus 200 is changed from the first source device 300-1 to the second source device 300-2, the above-described various embodiments may be applied.

For example, it may be assumed that the remote controller 100 is paired with each of the first and second source devices 300-1 and 300-2, and the source device providing the content output through the display apparatus 200 is the second source device 300-2. Because the second source device 300-2 provides the content, the display apparatus 200 may obtain the identification information of the second source device 300-2 and information related to the control code corresponding to the control instructions in the control code set of the second source device 300-2. When the identification information of the second source device 300-2 and the information related to the control code are transmitted from the display apparatus 200 to the remote controller 100, the remote controller 100 may identify the control code set corresponding to the second source device 300-2 based on the identification information of the second source device 300-2 and obtain the control code corresponding to the control instructions in the control code set based on the information related to the control code. Subsequently, the remote controller 100 may transmit the control signal including the control code to the second source device 300-2 using RF communication.

Figure 4:
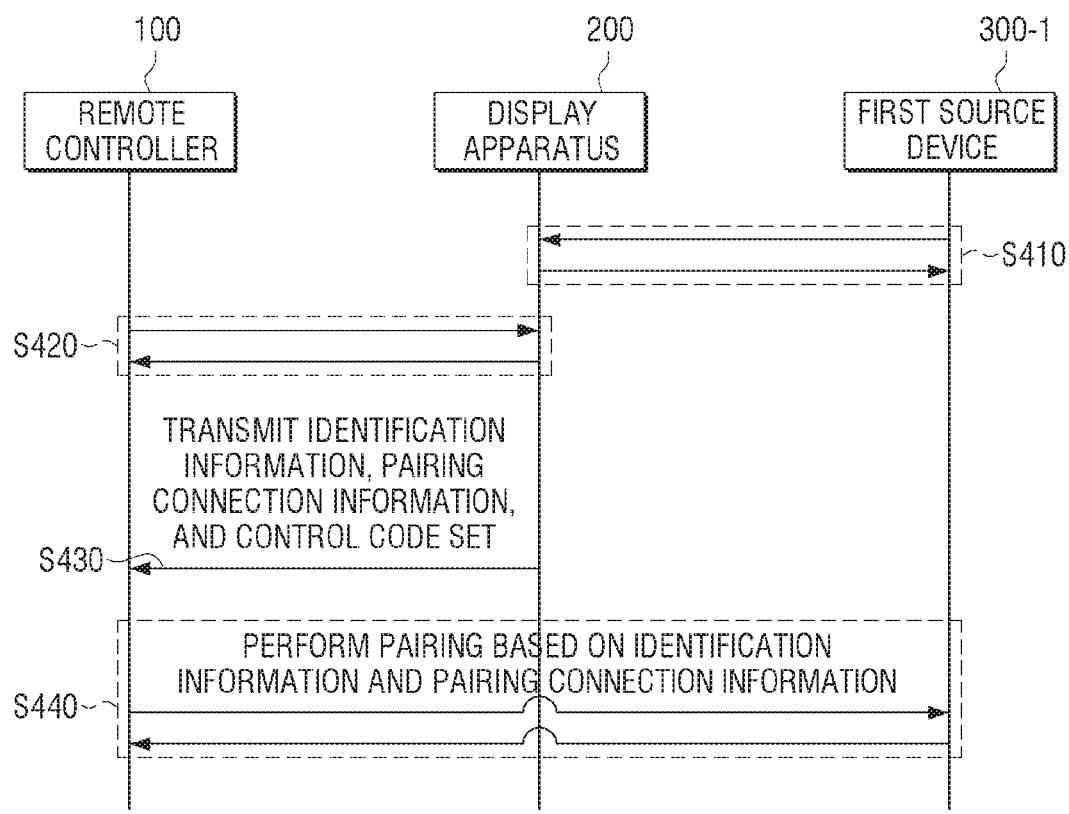
FIG. 4 is a sequence diagram for explaining pairing performed between a remote controller and a first source device according to an embodiment.

FIG. 4 is a sequence diagram for explaining pairing performed between the remote controller 100 and the first source device 300-1 according to an embodiment.

As shown in FIG. 4, the first source device 300-1 and the display apparatus 200 may be connected (S410), and the display apparatus 200 and the remote controller 100 may be connected (S420). Although it is shown that step S410 precedes step S420, step S420 may precede step S410.

Connection between the display apparatus 200 and the remote controller 100 according to an embodiment may be performed using various communication methods such as RF or IR. For example, the display apparatus 200 and the remote controller 100 may be connected through various communication methods such as pairing according to the Bluetooth standard or Wi-Fi direct.

The display apparatus 200 may transmit identification information of the connected first source device 300-1, pairing connection information, and a control code set to the remote controller 100 (S430). Here, the identification information, the pairing connection information, and the control code set may be previously stored in the display apparatus 200 and when the first source device 300-1 is identified as being connected, the identification information of the first source device 300-1, the pairing connection information, and the control code set that are previously stored may be transmitted to the remote controller 100. However, the present disclosure is not limited thereto, and when the first source device 300-1 is identified as being connected to the display apparatus 200, the identification information of the first source device 300-1, the pairing connection information, and the control code set may be received from an external server and transmitted to the remote controller 100. For example, the display apparatus 200 may request the external server transmit the identification information of the first source device 300-1, the pairing connection information, and the control code set.

The remote controller 100 may perform pairing with the first source device 300-1 based on the received identification information of the first source device 300-1 and pairing connection information (S440). Here, the pairing connection information means unique connection information of the first source device 300-1 required for performing pairing. For example, the connection information required for pairing connection may be different for each source device 300. For example, a specific pin code may be required for the first source device 300, and an operation of pressing a specific button may be required for the second source device 300-2. The remote controller 100 may perform pairing with the source device 300 based on the pairing connection information corresponding to the source device 300.

Figure 5:
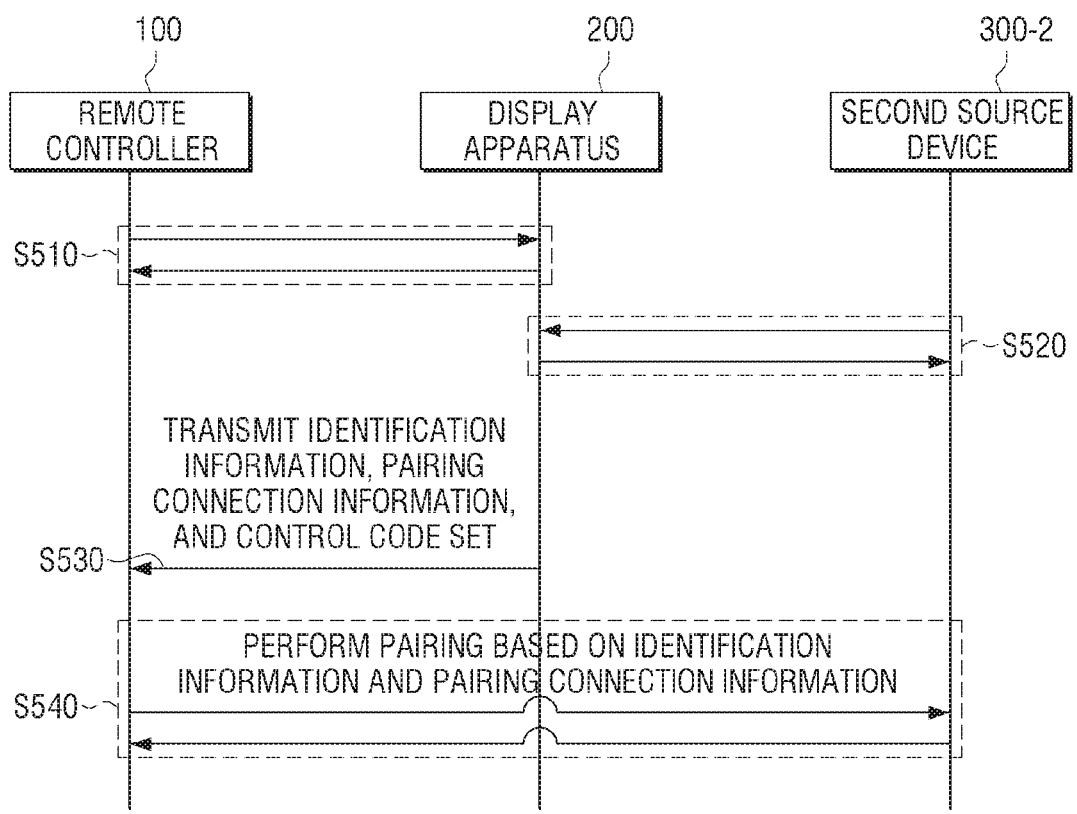
FIG. 5 is a sequence diagram for explaining pairing performed between a remote controller and a plurality of source devices according to an embodiment.

FIG. 5 is a sequence diagram for explaining pairing performed between the remote controller 100 and the plurality of source devices 300-1 and 300-2 according to an embodiment.

As shown in FIG. 5, when the remote controller 100 and the display apparatus 200 are connected (S510), the second source device 300-2 may be additionally connected to the display apparatus 200 (S520). Subsequently to FIG. 4, because step S520 of FIG. 5 is performed, the display apparatus 200 may be connected to the first source device 300-1 and the second source device 300-2.

Accordingly, the display apparatus 200 may transmit identification information, pairing connection information, and a control code set of the additionally connected second source device 300-2 to the remote controller 100 (S530).

The remote controller 100 may perform pairing with the second source device 300-2 based on the identification information of the second source device 300-2 and the pairing connection information (S540). For example, the remote controller 100 may be in a paired state with each of the first source device 300-1 and the second source device 300-2, that is, in a multi-paired state.

In addition to the identification information and the control code set of the first source device 300-1 received in step S430 of FIG. 4, the remote controller 100 may store the identification information and the control code set of the second source device 300-2 received in step S530. The remote controller 100 according to an embodiment may store the identification information and the control code set of each of the plurality of source devices 300-1 and 300-2 connected to the display apparatus 200.

Figure 6:
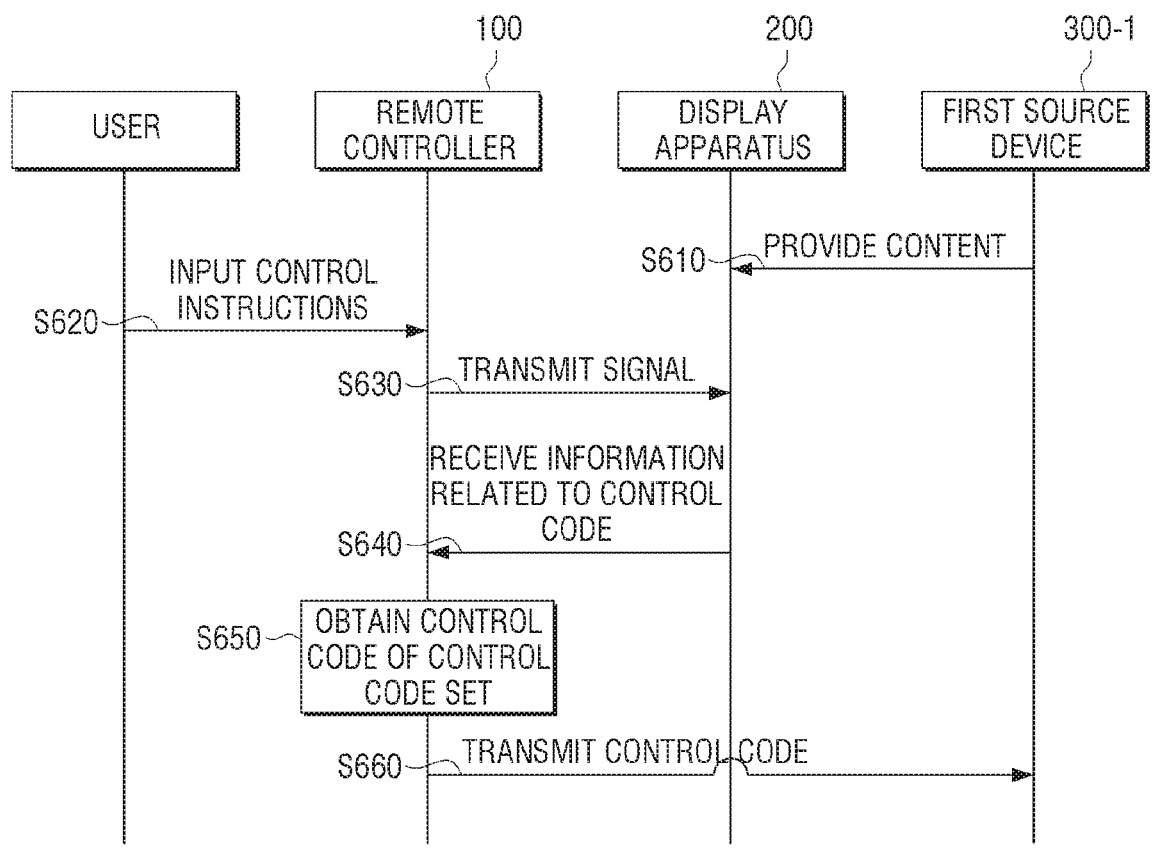
FIG. 6 is a sequence diagram for explaining a method of controlling a source device through a remote controller according to an embodiment.

FIG. 6 is a sequence diagram for explaining a method of controlling the first source device 300-1 through the remote controller 100 according to an embodiment.

As shown in FIG. 6, the first source device 300-1 is providing content to the display apparatus 200 (S610) and the display apparatus 200 is outputting the provided content.

When control instructions of a user are input through the remote controller 100 (S620), the remote controller 100 may transmit a signal including the control instructions of the user to the display apparatus 200.

Meanwhile, the signal including the control instructions of the user is not a signal including a control code for controlling either the display apparatus 200 or the first source device 300-1. For example, even though the remote controller 100 transmits a signal including channel change control instructions according to an operation of pressing a channel change button, channels of the display apparatus 200 and the first source device 300-1 are not changed.

The display apparatus 200 according to an embodiment analyzes the signal received in step S630 and identifies a control code for controlling the first source device 300-1 providing the currently outputting content the control instructions of the user included in the signal. Thereafter, the display apparatus 200 may transmit information related to the identified control code to the remote controller 100. Here, the information related to the control code may include index information of the control code. However, the present disclosure is not limited thereto, and the information related to the control code may include the control code according to another embodiment.

The remote controller 100 may obtain the control code in a control code set based on the received information related to the control code (S650). As an example, the received information may include identification information of the first source device 300-1 and index information of the control code. The remote controller 100 may identify the control code set of the first source device 300-1 based on the identification information and obtain the control code corresponding to the control instructions based on the index information. The remote controller 100 may transmit a control signal including the obtained control code to the first source device 300-1 (S660). Accordingly, the first source device 300-1 may be controlled to correspond to the control instructions.

In the above embodiment described above, the first source device 300-1 and the remote controller 100 are paired and RF communication is possible. That is, the remote controller 100 may obtain an RF control code in an RF control code set and transmit the control signal to the first source device 300-1 using RF communication. Another embodiment in which the control signal is transmitted using IR communication in a state where pairing is released will be described later.

Figure 7:
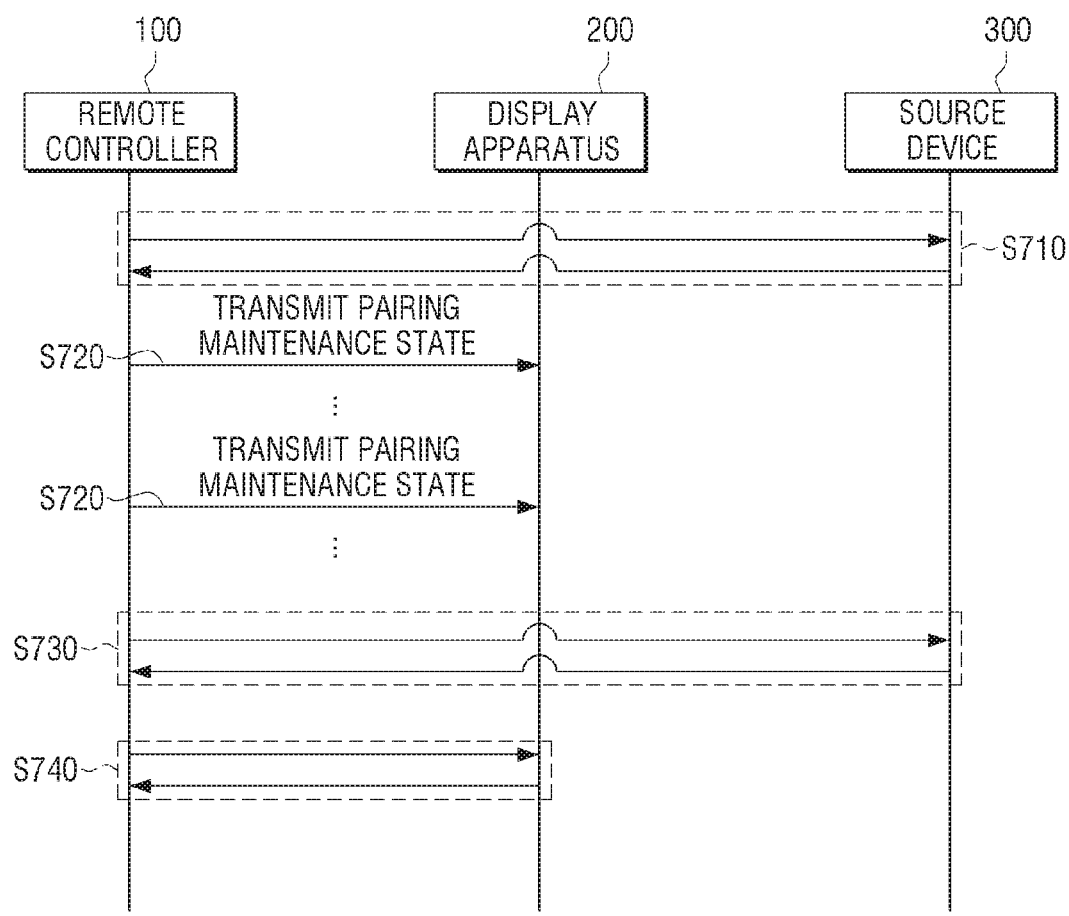
FIG. 7 is a sequence diagram for explaining transmission of a pairing maintenance state according to an embodiment.

FIG. 7 is a sequence diagram for explaining transmission of a pairing maintenance state according to an embodiment.

Referring to FIG. 7, when the first source device 300-1 and the remote controller 100 are paired (S710), the remote controller 100 may check the pairing maintenance state at a predetermined time interval. Also, the remote controller 100 may transmit the pairing maintenance state to the display apparatus 200 at the predetermined time interval (S720). Although in FIG. 7 only one source device 300 is shown, when the display apparatus 200 is connected to the plurality of source devices 300-1 and 300-2, the remote controller 100 may be paired with each of the plurality of source devices 300-1 and 300-2 and the remote controller 100 may transmit pairing maintenance states corresponding to each of the plurality of source devices 300-1 and 300-2.

When a pairing connection between the source device 300 and the remote controller 100 is released (S730), the remote controller 100 may transmit information indicating that the pairing connection to the source device 300 s released to the display apparatus 200 (S740).

According to an embodiment, the display apparatus 200 may retransmit pairing connection information corresponding to the source device to the remote controller 100. The remote controller 100 may re-perform pairing with the source device 300 based on the received pairing connection information. Here, the pairing connection information of the source device 300, which the display apparatus 200 retransmits to the remote controller 100, may be updated information compared to the pairing connection information transmitted in step S430 of FIG. 4.

According to another embodiment, the display apparatus 200 may determine that transmission and reception of a control signal between the source device 300 and the remote controller 100 using RF communication is impossible. The display apparatus 200 may identify an IR control code corresponding to control instructions of a user in an IR control code set of the source device 300 and obtain information related to the identified IR control code. That is, the display apparatus 200 may obtain information related to the control code based on the IR control code set, other than an RF control code set. The display apparatus 200 may transmit the obtained information to the remote controller 100. The remote controller 100 may obtain the IR control code based on the received information. The remote controller 100 may transmit the control signal including the IR control code to the source device 300 using IR communication.

Figure 8:
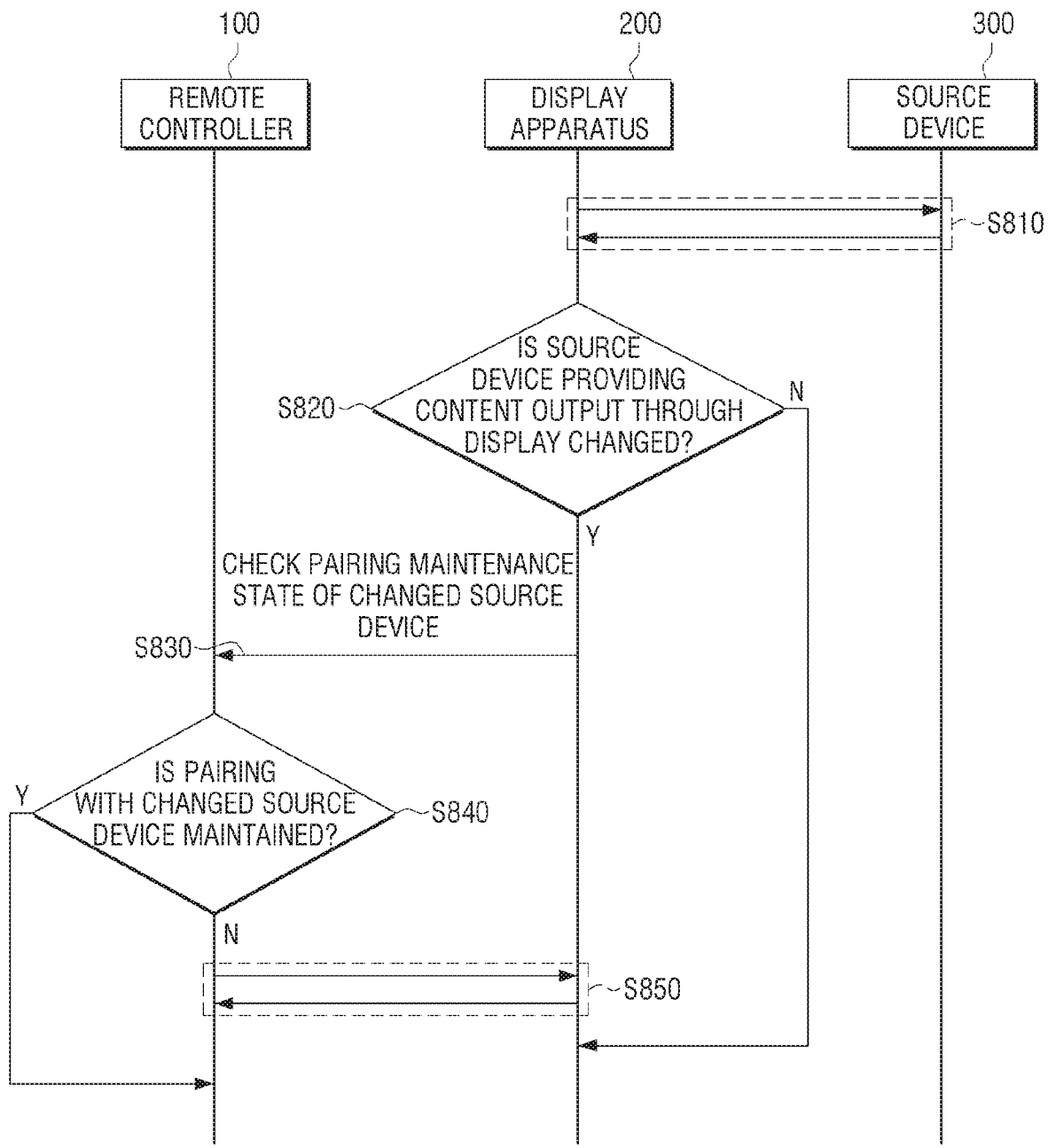
FIG. 8 is a sequence diagram for explaining a change in source devices providing content according to an embodiment.

FIG. 8 is a sequence diagram for explaining a change in the source device 300 providing content according to an embodiment.

Referring to FIG. 8, the display apparatus 200 may be connected to source device 300, including the plurality of source devices 300-1 and 300-2 (S810). For example, the content provided by the second source device 300-2 among the plurality of source devices 300-1 and 300-2 is output through the display apparatus 200. When the source device 300 providing the content output through the display apparatus 200 is changed (S820: Y), the display apparatus 200 may request the remote controller 100 to check a pairing maintenance state with the changed source device 300 (S830). For example, when the second source device 300-2 is changed to the first source device 300-1, the remote controller 100 may check the pairing maintenance state between the first source device 300-1 and the remote controller 100 according to a request of the display apparatus 200.

When it is identified that pairing between the changed source device 300 and the remote controller 100 is released according to a check result (S840: N), the remote controller 100 may transmit information about a pairing release state to the display apparatus 200. According to an embodiment, the display apparatus 200 may transmit information related to an IR control code for controlling the first source device 300-1 obtained based on an IR control code set to the remote controller 100 (S850).

Figure 9:
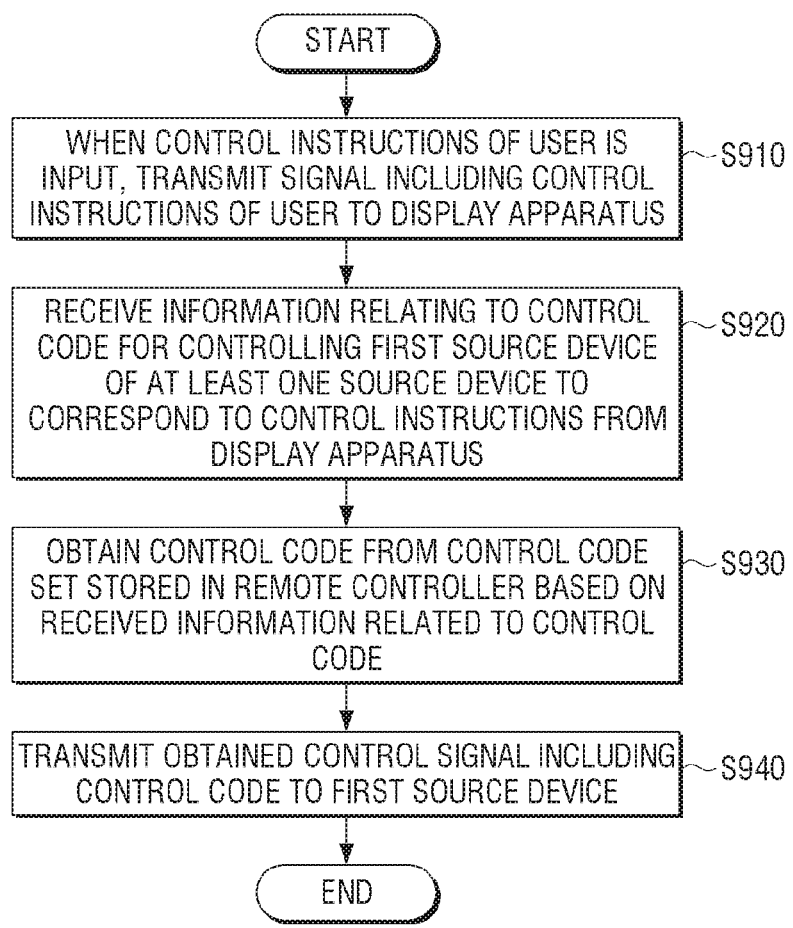
FIG. 9 is a flowchart for explaining a control method of a remote controller according to an embodiment.

FIG. 9 is a flowchart for explaining a control method of a remote controller according to an embodiment.

First, when control instructions of a user are input, a signal including the control instructions of the user is transmitted to a display apparatus (S910). Subsequently, information related to a control code for controlling a first source device of at least one source device to correspond to the control instructions is received from the display apparatus (S920). The control code is obtained from a control code set stored in the remote controller based on the received information related to the control code (S930). A control signal including the obtained control code is transmitted to the first source device (S940).

The control method according to an embodiment includes steps of receiving identification information of a second source device additionally connected to the display apparatus, pairing connection information with the second source device, and a control code set corresponding to the second source device from the display apparatus, and performing pairing with the second source device based on the identification information and the pairing connection information.

Here, the information related to the control code includes identification information of the first source device and index information of the control code corresponding to the control instructions in the control code set, and step S930 of obtaining the control code may identify the control code set corresponding to the first source device based on the identification information of the first source device and obtain the control code from the identified control code set based on the index information.

The control code set corresponding to the first source device includes an RF control code set for controlling the first source device by RF communication and an IR control code set for controlling the first source device by IR communication, and step S930 of obtaining the control code may obtain an RF control code in the RF control code set corresponding to the first source device based on the received information related to the control code, and step S940 of transmitting the control signal may transmit the control signal including the RF control code to the first source device through an RF communication module of the remote controller.

The control method according to an embodiment may further include steps of checking a pairing maintenance state with the at least one source device at a predetermined time interval and, when it is identified that pairing with the first source device of the at least one source device is released, requesting the display apparatus to send information related to the control code for controlling the first source device by IR communication.

In step S930, the control code may be obtained from the IR control code in the IR control code set corresponding to the first source device based on the information related to the control code received in response to a request. Further, in step S940, the control signal may be transmitted to the first source device through an IR communication module of the remote controller based on the IR control code.

The control method according to another embodiment may further include steps of: checking a pairing maintenance state with the at least one source device at a predetermined time interval; when it is identified that pairing of the first source device of the at least one source device is released, requesting the display apparatus to send pairing connection information corresponding to the first source device, and re-performing pairing with the first source device based on the received pairing connection information according to a request.

Figure 10:
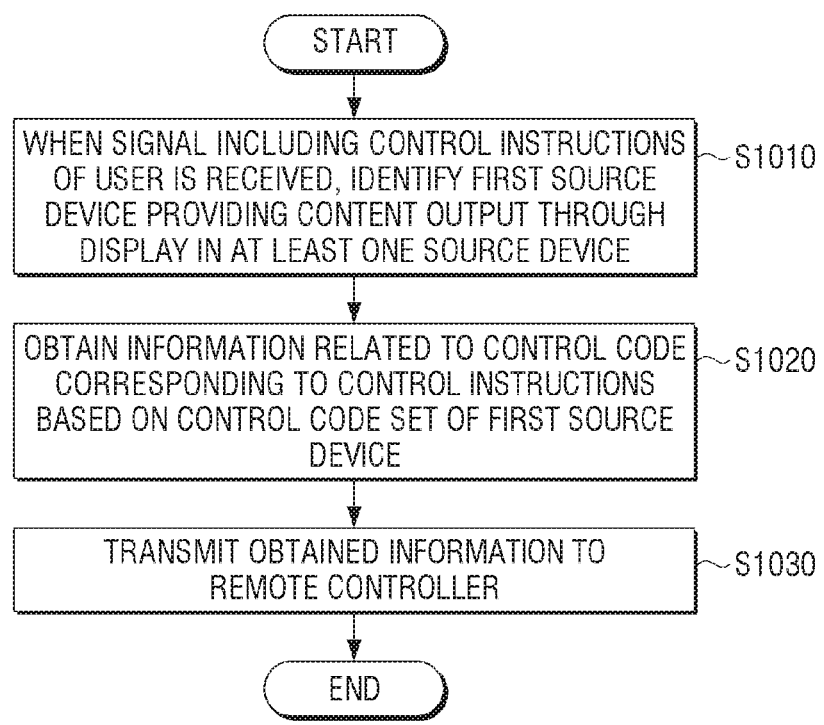
FIG. 10 is a flowchart for explaining a control method of a display apparatus according to an embodiment.

FIG. 10 is a flowchart for explaining a control method of a display apparatus according to an embodiment.

First, when a signal including control instructions of a user is received, a first source device providing content output through a display is identified from among at least one source device (S1010). Next, information related to a control code corresponding to the control instructions is obtained based on a control code set of the first source device (S1020). Then, the obtained information is transmitted to a remote controller (S1030).

The control method according to an embodiment may further include, when a second source device is additionally connected through a first communicator, transmitting identification information of the second source device, pairing connection information with the second source device, and a control code set corresponding to the second source device to the remote controller.

Here, the control code set corresponding to the first source device includes an RF control code set for controlling the first source device by RF communication and an IR control code set for controlling the first source device by IR communication, and in step S1020 the information related to the control code may include information related to an RF control code corresponding to the control instructions based on the RF control code set of the first source device.

The control method according to an embodiment further includes a step of receiving information about a pairing maintenance state between the remote controller and the at least one source device at a predetermined time interval, and the information related to the control code may include information related to an IR control code corresponding to the control instructions in the IR control code set corresponding to the first source device when it is identified that pairing between the remote controller and the first source device is released based on the received information.

The various embodiments described above may be embodied in a recording medium which may be read by a computer or a similar device using software, hardware, or a combination thereof. In some cases, the embodiments described herein may be implemented by a processor itself. According to a software implementation, the embodiments such as procedures and functions described herein may be implemented in separate software modules. Each of the software modules may perform one or more of the functions and operations described herein.

Meanwhile, computer instructions for performing processing operations according to various embodiments described above may be stored in a non-transitory computer-readable medium. The computer instructions stored on the non-transitory computer-readable medium may allow a specific device to perform the processing operations according to various embodiments described above when executed by the processor.

The non-transitory computer-readable medium includes a medium for semi-permanently storing data and readable by an apparatus. Specific examples of the non-transitory computer-readable medium include a compact disc (CD), DVD, hard disk, Blu-ray disk, USB, memory card, ROM, and the like.

Although embodiments have been illustrated and described, the present disclosure is not limited to the above-mentioned specific embodiments, but may be variously modified by those skilled in the art to which the present disclosure pertains without departing from the spirit and scope of the present disclosure as claimed in the claims. In addition, such modifications should also be understood to fall within the scope of the present disclosure.

What is claimed is:

1. A remote controller configured to pair with at least one source device that is connected to a display apparatus, the remote controller comprising:
   an input interface;
   a communicator comprising an infrared communicator and a radio frequency communicator;
   a storage; and
   a processor configured to:
      transmit, to the display apparatus via the communicator, a signal indicating control instructions based on a first user input received through the input interface,
      receive, from the display apparatus via the communicator, information related to a first control code for controlling a first source device of the at least one source device based on the control instructions,
      identify the first control code from a first control code set stored in the storage based on the information related to the first control code, and
      control the communicator to transmit a first control signal indicating the first control code to the first source device based on the first user input,
   wherein the first control code set includes a first radio frequency control code set for controlling the first source device by radio frequency communication and a first infrared control code set for controlling the first source device by infrared communication, and
   wherein the processor is further configured to:
      based on the remote controller being paired with the first source device, obtain a first radio frequency control code corresponding to the first control code from the first radio frequency control code set and control the radio frequency communicator to transmit the first control signal indicating the first radio frequency control code to the first source device, and
      based on the remote controller not being paired with the first source device, obtain a first infrared control code corresponding to the first control code from the first infrared control code set and control the infrared communicator to transmit the first control signal indicating the first infrared control code to the first source device.

2. The remote controller as claimed in claim 1, wherein the processor is further configured to:
  receive, from the display apparatus via the communicator, identification information of a second source device connected to the display apparatus, pairing connection information corresponding to the second source device and a second control code set corresponding to the second source device;
  store the identification information of the second source device, the pairing connection information corresponding to the second source device and the second control code set in the storage; and
  perform pairing, via the communicator, with the second source device based on the identification information of the second source device and the pairing connection information corresponding to the second source device.

3. The remote controller as claimed in claim 1, wherein the information related to the first control code includes identification information of the first source device and first index information of the first control code corresponding to the control instructions in the first control code set, and
  wherein the processor is further configured to identify the first control code set corresponding to the first source device based on the identification information of the first source device and obtain the first control code from the first control code set identified based on the first index information.

4. The remote controller as claimed in claim 1, wherein the processor is further configured to:
  check a pairing maintenance state with the at least one source device at a time interval,
  request, based on pairing with the first source device of the at least one source device being released, via the communicator, the display apparatus to send pairing connection information corresponding to the first source device, and
  perform pairing with the first source device based on the pairing connection information corresponding to the first source device received according to a request.

5. The remote controller as claimed in claim 1, wherein the processor is further configured to:
  based on the remote controller being paired with the first source device, check a pairing maintenance state with the first source device at a time interval, and
  based on pairing with the first source device being released and a second user input being received through the input interface, obtain an infrared control code corresponding to the second user input from the first infrared control code, and
  control the infrared communicator to transmit a control signal indicating the infrared control code to the first source device.

6. A display apparatus comprising:
  a display;
  a first communicator;
  a second communicator;
  a storage; and
  a processor configured to:
    establish a communication connection with a remote controller via the second communicator,
    identify, based on control instructions included in a signal received from the remote controller through the communication connection via the second communicator, a first source device providing content output from at least one source device connected through the first communicator,
    identify a first control code corresponding to the control instructions from among a first control code set corresponding to the first source device, the first control code set being stored in the storage, and
    transmit the first control code to the remote controller through the communication connection via the second communicator,
  wherein the first control code set stored in the storage includes a first radio frequency control code set for controlling the first source device by radio frequency communication and a first infrared control code set for controlling the first source device by infrared communication, and
  wherein the processor is further configured to:
    based on the remote controller being paired with the first source device, obtain a first radio frequency control code corresponding to the first control code from the first radio frequency control code set and control the second communicator to transmit the first radio frequency control code to the remote controller, and
    based on the remote controller not being paired with the first source device, obtain a first infrared control code corresponding to the first control code from the first infrared control code set and control the second communicator to transmit the first infrared control code to the remote controller.

7. The display apparatus as claimed in claim 6, wherein, the processor is further configured to transmit, based on a second source device being connected through the first communicator, identification information of the second source device, pairing connection information corresponding to the second source device, and a second control code set corresponding to the second source device to the remote controller through the second communicator.

8. The display apparatus as claimed in claim 6, wherein the processor is further configured to:
  receive information concerning a pairing maintenance state between the remote controller and the at least one source device at a time interval through the second communicator,
  based on the pairing maintenance state indicating that pairing between the remote controller and the at least one source device is released, obtain the first infrared control code from the first infrared control code set, and
  control the second communicator to transmit the first infrared control code to the remote controller.

9. A control method of a remote controller configured to pair with at least one source device that is connected to a display apparatus, the control method comprising:
  transmitting a signal indicating control instructions to the display apparatus based on a first user input received through an input interface of the remote controller;
  receiving information related to a first control code for controlling a first source device of the at least one source device based on the control instructions from the display apparatus;
  identifying the first control code from a first control code set stored in the remote controller based on the information related to the first control code; and
  transmitting a first control signal indicating the first control code to the first source device based on the first user input,
  wherein the first control code set includes a first radio frequency control code set for controlling the first source device by radio frequency communication and a first infrared control code set for controlling the first source device by infrared communication, wherein the identifying of the first control code includes:
based on the remote controller being paired with the first source device, obtaining a first radio frequency control code corresponding to the first control code from the first radio frequency control code set, and
based on the remote controller not being paired with the first source device, obtaining a first infrared control code corresponding to the first control code from the first infrared control code set, and wherein the transmitting includes:
based on that obtaining the first radio frequency control code, transmitting the first control signal indicating the first radio frequency control code to the first source device via radio frequency communication, and
based on that obtaining the first infrared control code, transmitting the first control signal indicating the first infrared control code to the first source device via infrared communication.

10. The control method as claimed in claim 9, wherein the information related to the first control code includes identification information of the first source device and first index information of the first control code corresponding to the control instructions in the first control code set, and
wherein the identifying includes identifying the first control code set corresponding to the first source device based on the identification information of the first source device and obtaining the first control code from the first control code set identified based on the first index information.

11. The control method as claimed in claim 9, further comprising:
checking, based on the remote controller being paired with the first source device, a pairing maintenance state with the first source device at a time interval, and
obtaining, based on pairing with the first source device being released and a second user input being received, an infrared control code corresponding to the second user input from the first infrared control code, and
transmitting a control signal indicating the infrared control code to the first source device via infrared communication.

12. The control method as claimed in claim 9, further comprising:
checking a pairing maintenance state with the at least one source device at a time interval,
requesting, based on pairing with the first source device of the at least one source device being released, the display apparatus to send pairing connection information corresponding to the first source device, and
pairing with the first source device based on the pairing connection information corresponding to the first source device received according to a request.

13. The control method as claimed in claim 9, further comprising:
receiving identification information of a second source device connected to the display apparatus, pairing connection information corresponding to the second source device, and a second control code set corresponding to the second source device from the display apparatus;
storing the identification information of the second source device, the pairing connection information corresponding to the second source device and the second control code set; and
performing pairing with the second source device based on the identification information of the second source device and the pairing connection information corresponding to the second source device.

\* \* \* \* \*